US011231389B2

(12) United States Patent
Pratt et al.

(10) Patent No.: US 11,231,389 B2
(45) Date of Patent: Jan. 25, 2022

(54) METHOD AND APPARATUS FOR ELECTROLYTE CONCENTRATION MEASUREMENT IN AN ELECTROCHEMICAL SENSOR

(71) Applicant: HONEYWELL INTERNATIONAL INC., Morris Plains, NJ (US)

(72) Inventors: Keith Francis Edwin Pratt, Morris Plains, NJ (US); Martin Geoffrey Jones, Morris Plains, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 198 days.

(21) Appl. No.: 16/336,947

(22) PCT Filed: Sep. 30, 2016

(86) PCT No.: PCT/EP2016/073508
§ 371 (c)(1),
(2) Date: Mar. 27, 2019

(87) PCT Pub. No.: WO2018/059719
PCT Pub. Date: Apr. 5, 2018

(65) Prior Publication Data
US 2019/0277801 A1 Sep. 12, 2019

(51) Int. Cl.
*G01N 27/416* (2006.01)
*G01N 27/413* (2006.01)
*G01N 27/404* (2006.01)

(52) U.S. Cl.
CPC ..... *G01N 27/4163* (2013.01); *G01N 27/4045* (2013.01); *G01N 27/413* (2013.01); *G01N 27/4166* (2013.01)

(58) Field of Classification Search
CPC ........... G01N 27/4045; G01N 27/4166; G01N 27/413; G01N 27/4163; G01N 27/404;
(Continued)

(56) References Cited

U.S. PATENT DOCUMENTS

| 5,423,963 A | 6/1995 | Fletcher et al. |
| 2013/0087456 A1 | 4/2013 | Jones et al. |
| 2013/0087457 A1 | 4/2013 | Pratt et al. |

FOREIGN PATENT DOCUMENTS

| CN | 102226807 A | 10/2011 |
| CN | 102830151 A | 12/2012 |

(Continued)

OTHER PUBLICATIONS

International Search Report and Written Opinion for Application No. PCT/EP2016/073508, dated May 31, 2017, 9 pages.
(Continued)

*Primary Examiner* — Gurpreet Kaur
(74) *Attorney, Agent, or Firm* — Alston & Bird LLP (57) ABSTRACT

Embodiments relate generally to systems and methods for identifying the concentration of an electrolyte. A method may comprise scanning a diagnostic micro-electrode of an electrochemical sensor using scanning voltammetry at a plurality of electrolyte concentrations; generating a variable set of readings from the first scanning voltammetry scan using a potential difference between a strong hydrogen adsorption peak and an oxide reduction peak and/or oxide formation peak at each of the plurality of electrolyte concentrations; and determining a correlation by plotting the variable set of readings and the plurality of electrolyte concentrations. In some embodiments, the method may comprise scanning a diagnostic micro-electrode of a second electrochemical sensor using scanning voltammetry, wherein the second electrochemical sensor has been employed; generating a second set of readings; and determining the electrolyte concentration of the electrolyte of the second electrochemical sensor by applying the determined correlation to the second set of readings.

14 Claims, 5 Drawing Sheets

(58) Field of Classification Search
CPC ........... G01N 27/4074; G01N 27/3277; G01N 33/007
See application file for complete search history.

(56) References Cited

FOREIGN PATENT DOCUMENTS

| | | |
|---|---|---|
| EP | 2581734 A2 | 4/2013 |
| EP | 2581735 A1 | 4/2013 |

OTHER PUBLICATIONS

Communication pursuant ot Article 94(3) for European Application No. 16778303.4, dated Mar. 11, 2020.
Office Action issued in Chinese Application No. 201680089587.5 dated Dec. 23, 2020, 7 pages.
Notification to Grant Patent Right issued in Chinese Application No. 201680089587.5 dated Aug. 2, 2021, 4 pages.
Intention to Grant issued in European Application No. 16778303.4 dated Nov. 2, 2021, 41 pages.

METHOD AND APPARATUS FOR ELECTROLYTE CONCENTRATION MEASUREMENT IN AN ELECTROCHEMICAL SENSOR

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electrochemical sensors traditionally comprise a gas diffusion working electrode, often based on a platinum (Pt) or graphite/platinum catalyst dispersed on polytetrafluorethylene (PTFE) tape. The target gas is reacted at this electrode while a balancing reaction takes place at the counter electrode. The electrodes are contained within an outer housing which contains a liquid electrolyte, such as sulfuric acid. The gas typically enters the housing through a controlled diffusion access port, which regulates the ingress of target gas into the cell. The gas reacts at the electrode and affects the electrical output of the sensor.

SUMMARY

In an embodiment, a method for identifying a concentration of an electrolyte may comprise scanning a diagnostic electrode of an electrochemical sensor using scanning voltammetry, wherein the electrochemical sensor has been employed, wherein the diagnostic electrode comprises a smaller surface area than a working electrode or a counter electrode; generating a set of readings; identifying one or more peaks in the set of reading; and determining the electrolyte concentration of the electrolyte of the electrochemical sensor by applying a correlation with the identified peak(s).

In an embodiment, an electrochemical sensor may comprise a housing; an electrolyte disposed within the housing; a plurality of electrodes in contact with the electrolyte within the housing, wherein the plurality of electrodes comprises a working electrode and a counter electrode; a diagnostic micro-electrode; and a control circuitry configured to scan the diagnostic micro-electrode of the electrochemical sensor using scanning voltammetry at a plurality of electrolyte concentrations; generate a variable set of readings from the first voltammetry scan using oxide formation and reduction peak(s) of the scan; and determine a correlation by plotting the variable set of readings and the plurality of electrolyte concentrations.

In an embodiment, a method for identifying a concentration of an electrolyte may comprise scanning a diagnostic electrode of an electrochemical sensor using a first scanning voltammetry scan at a plurality of electrolyte concentrations, wherein the diagnostic electrode comprises a smaller surface area than a working electrode or a counter electrode; generating a variable set of readings from the first scanning voltammetry scan using one or more oxide peak(s) of the scan; and determining a correlation by plotting the variable set of readings and the plurality of electrolyte concentrations.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include systems and methods for determining characteristics of an electrolyte in an electrochemical sensor. Electrochemical gas sensors that operate based on aqueous electrolytes (such as sulfuric acid) may exhibit changes in electrolyte concentration due to water uptake or water loss with the ambient environment. The resulting change in concentration affects the performance of the sensor, for example resulting in changes in gas sensitivity and/or the resulting output signal values from the sensor, or in extreme cases can result in the sensor bursting (too much water uptake) or failing due to the electrolyte becoming too dry or too concentrated. It may therefore be desirable to be able to measure the electrolyte concentration so that suitable remedial action may be taken, for example compensating for sensitivity loss or flagging impending failure.

Embodiments disclosed herein may allow for direct electrochemical measurement of the electrolyte concentration. Typical methods for determining electrolyte concentration may involve impedance measurement. However, impedance measurements do not give a unique result, and there are two possible electrolyte concentrations for any given impedance (as would be known to one skilled in the art). The impedance of the electrolyte is also affected by geometrical factors and the physical location of the electrolyte within the sensor. The impedance is also a function not only of molar concentration but also of saturation limit of the electrolyte within the separator components. In order to be able to compensate sensors for these performance changes it is therefore desirable to be able to measure the electrolyte concentration using a simple technique which can be integrated into an instrument or intelligent sensor. The disclosed methods and systems may allow for sensors to be operated over a wider environmental range with reduction in the need for recalibration.

Methods and systems disclosed herein may involve performing scanning voltammetry on an electrode located within the sensor. In some embodiments, the voltammetry may be performed on a micro-electrode within the sensor. This involves applying a ramped waveform to the electrode over a range of potentials between the onsets of electrolysis of the electrolyte. In a scanning voltammogram of electrochemically cleaned platinum in sulfuric acid a number of peaks are present. Peaks due to generation and stripping of surface adsorbed hydrogen occur near to the cathodic limit, these occur at a well-defined absolute potential and can be used as a stable reference point. At the other end of the voltammogram, oxide is generated and stripped off (or formed and reduced). The position of the oxide reduction peak has been found to be a function of the electrolyte concentration, and the potential difference between a hydrogen peak and the oxide reduction peak is linearly dependent on the electrolyte concentration. The oxide formation peak may also be a linear function of the electrolyte concentration. The resulting measured current vs voltage trace exhibits peaks due to generation and removal of adsorbed hydrogen, and also due to generation and removal of platinum oxide on the electrode surface. Surprisingly, the disclosed embodiments illustrate that the potential difference between one of the hydrogen peaks and the platinum oxide formation or reduction peaks is a function of electrolyte concentration or pH.

There may be a number of end purposes for the concentration determination. The resulting electrolyte concentration measurement can be used to correct an output value from the signal to provide a more accurate reading of a concentration of one or more gases, where compensation is applied to the sensor output. This would be applied along with the offset and amplification. Additionally, an error may be flagged because the concentration has gotten to a level where compensation can no longer be accurately applied but the sensor may recover. The other uses would be to identify an abnormal concentration, i.e. too high or too low of a concentration that could result in an error and/or permanent failure of the sensor. The sensor may be considered to have completely failed and is not recoverable when the electrolyte has gotten so concentrated that components in the sensor have been irreversibly degraded or the volume has increased to the extent that the sensor is likely to have leaked or burst.

The described method may be implemented using a small low surface area platinum electrode (not a conventional gas diffusion electrode) as this can be scanned rapidly, with low power consumption and with minimal distortion of the voltammogram due to ohmic losses. This diagnostic electrode may be separate from the main working electrode, where the working electrode may not be disturbed by the measurement and can continue to detect gas while the diagnostic electrode is operating if a dual channel potentiostat is used, or the measurements can be multiplexed between the working and diagnostic electrodes. The method can be used instead of or in addition to a more conventional impedance based electrolyte concentration measurement, the use of combined measurements allows both concentration and saturation level of the electrolyte to be determined.

Figure 1:
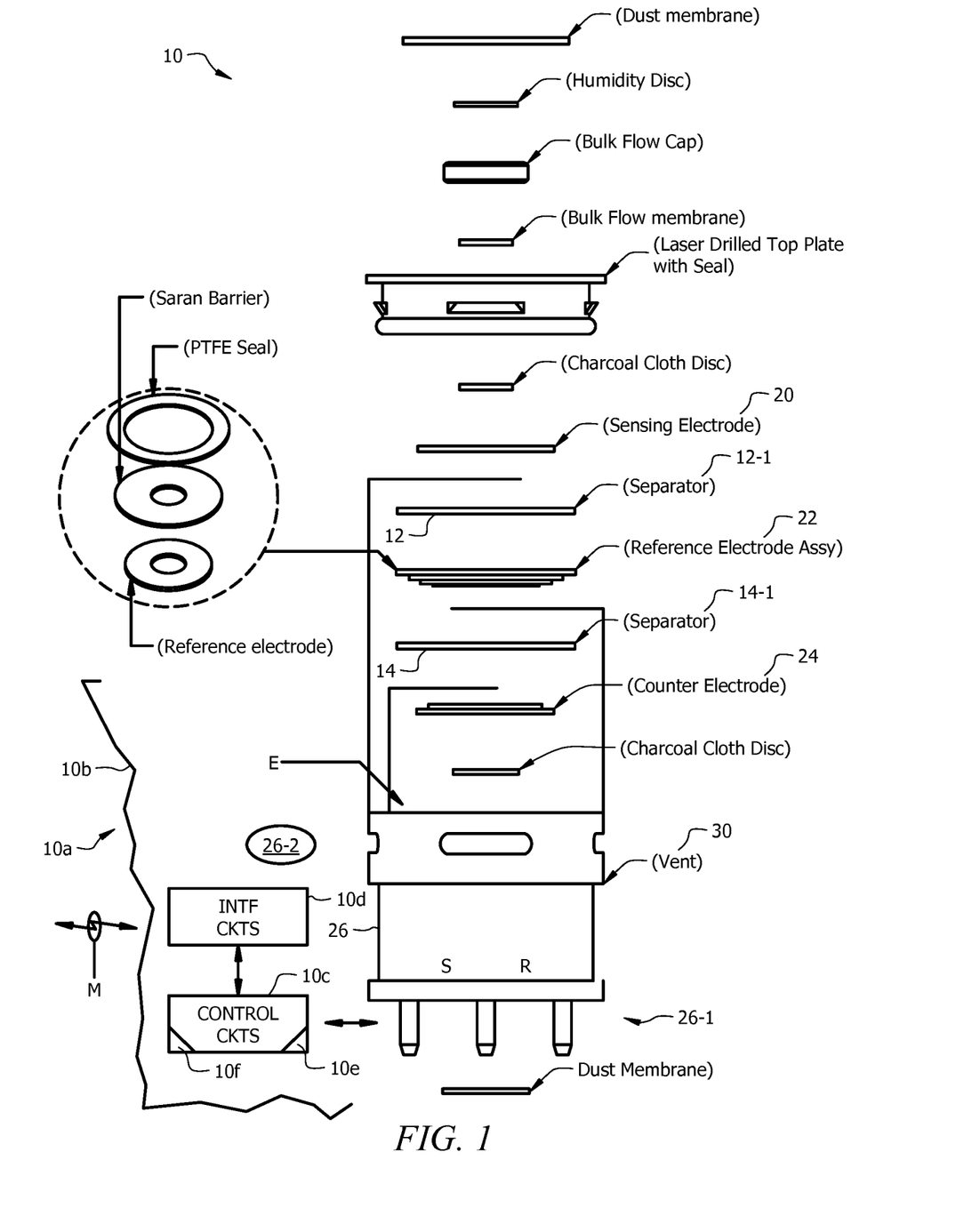
FIG. 1 illustrates an exploded view of a gas sensor according to an embodiment.

FIG. 1 illustrates an exploded view of an exemplary electrochemical sensor 10, with diagnostic micro-electrodes 12, 14, used to carry out the below described experiments. Micro-electrodes 12, 14 are installed in sensor 10 at the positions shown at separator 12-1 near a working electrode 20 (which may also be known as a sensing electrode), and at separator 14-1 between the reference and counter electrodes 22, 24.

Electrolyte E is contained in the housing 26. Micro-electrodes 12, 14 are immersed in the electrolyte E, and are not in the direct path of the target gas.

The above described electrodes such as 12, 14, 20, 22, and 24 along with the electrolyte E are carried in a housing 26. Housing 26 can include a vent 30 as would be understood by those of skill in the art. Sensor 10 can be carried by a gas detector 10a, in an external housing 10b.

Electrical connecting elements, indicated at 26-1, carried by housing 26 are coupled to the various electrodes in the housing 26. A power supply 26-2, which could be implemented as a rechargeable battery, could be carried in external housing 10b to energize the gas detector 10a.

External housing 10b can also carry control circuits 10c which are coupled to the connector elements 26-1 to receive signals from and coupled signals to the electrodes 20, 22, 24 so as to sense conditions in the sensor 10, or to control the operation of one or more electrodes 20, 22, 24 to carry out the operational and diagnostic methods described herein.

The gas detector 10a can communicate via interface circuits 10d, coupled to control circuits 10c, via a medium M (which could be wired, or wireless), with displaced monitoring systems. The control circuits 10c can be implemented, at least in part, with a programmable processor 10e which executes pre-stored control instructions 10f. Other elements of the sensor 10, illustrated in FIG. 1, are conventional and would be known to those of skill in the art.

Exemplary micro-electrodes can be fabricated from PTFE coated platinum wire (Advent research materials part number PT5431, comprising 75 μm diameter platinum wire with approximately 18 μm thick PTFE coating). In some embodiments, the micro-electrodes 12, 14 may comprise a 50 μm diameter platinum wire that is approximately 6 mm long and immersed in the electrolyte E. The wire can be cut with a scalpel to produce a microdisc electrode inside the sensor 10, and the PTFE insulation stripped from the end of the wire external to the sensor 10 to allow electrical contact to be made. The exposed tip of the wire can be pushed into the respective separators 12-1, 14-1 to avoid it shorting against the adjacent electrodes 20, 22 24. However an alternative approach includes sandwiching the micro-electrodes 12, 14 between two separators. Other configurations come within the spirit and scope of the invention. For example, the micro-electrodes may comprise uninsulated platinum wire and may operate as micro-cylinder electrodes, or they may be formed by deposition of platinum onto a contact pin or pad by techniques such as electroplating or sputtering, or by thick film printing platinum onto a ceramic substrate. In some embodiments, each micro-electrode 12, 14 may be used for separate diagnostic purposes, such as hydrogen peak reference, oxygen peak identification, etc.

In some embodiments, scanning voltammetry may be completed on one or more of the micro-electrodes 12, 14 to provide one or more diagnostic scans. Scanning voltammetry is an electrochemical technique which measures the current that develops in an electrochemical cell under conditions where voltage is in excess of that predicted by the Nernst equation. Voltammetry is performed by cycling the potential of an electrode, and measuring the resulting current. In scanning voltammetry, the electrode potential may ramp linearly versus time in cyclical phases. In some embodiments, other waveforms may be used to complete the scanning voltammetry. For example, the waveform may be a stepped staircase (staircase voltammetry) or a staircase with additional superimposed positive and negative steps (square wave voltammetry). The rate of voltage change over time during each of these phases is known as the experiment's scan rate (V/s). The results of a scanning voltammetry scan on one or more of the micro-electrodes 12, 14 may generate diagnostic information about the sensor 10.

Figure 2:
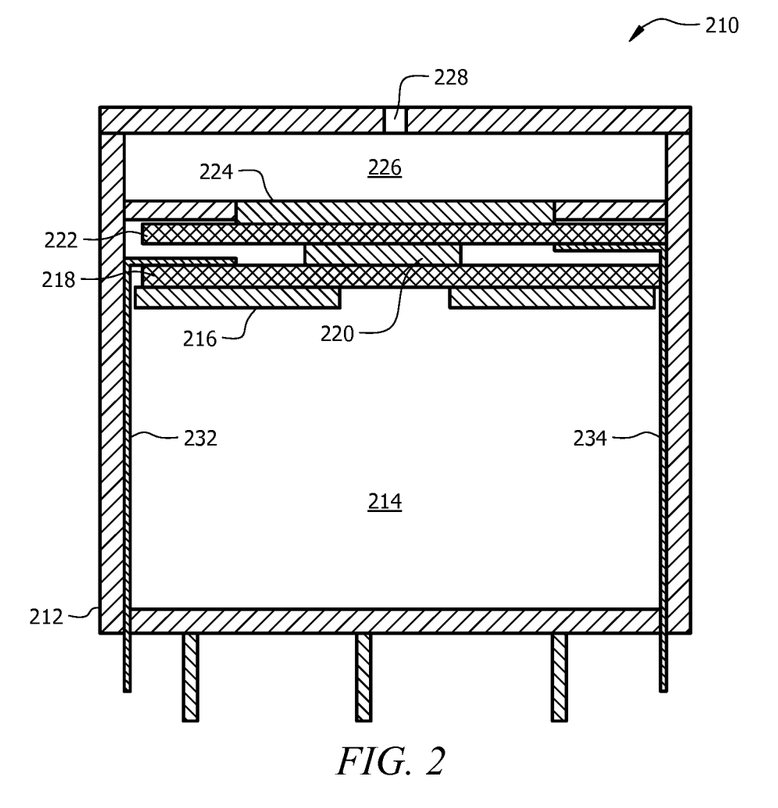
FIG. 2 schematically illustrates a cross-section drawing of an electrochemical sensor according to an embodiment.

FIG. 2 illustrates a cross-section drawing of an electrochemical sensor 210. The sensor 210 generally comprises a housing 212 defining a cavity or reservoir 214 designed to hold an electrolyte solution. A working electrode 224 can be placed between an opening 228 and the reservoir 214. A counter electrode 216 and a reference electrode 220 can be positioned within the reservoir 214. When the gas reacts at the interface between the working electrode 224 and the electrolyte within the separator 222, an electrical current and/or potential can be developed between the electrodes 216, 220 to provide an indication of the concentration of the gas. A reference electrode 220 may also be positioned within the reservoir 214 to provide a reference for the potential at the working electrode.

The housing 212 defines the interior reservoir 214, and one or more openings 228 can be disposed in the housing 212 to allow a gas to be detected to enter the housing 212 into a gas space 226. The housing 212 can generally be formed from any material that is substantially inert to the electrolyte and gas being measured. In an embodiment, the housing 212 can be formed from a polymeric material, a metal, or a ceramic. For example, the housing can be formed from a material including, but not limited to, acrylonitrile butadiene styrene (ABS), polyphenylene oxide (PPO), polystyrene (PS), polypropylene (PP), polyethylene (PE) (e.g., high density polyethylene (HDPE)), polyphenylene ether (PPE), or any combination or blend thereof.

One or more openings 228 can be formed through the housing 212 to allow the ambient gas to enter the gas space 226 and/or allow any gases generated within the housing 212 to escape. In an embodiment, the electrochemical sensor 210 may comprise at least one inlet opening 228 to allow the ambient gas to enter the housing 212. The opening 228 can be disposed in a cap when a cap is present and/or in a wall of the housing 212. In some embodiments, the opening 228 can comprise a diffusion bather to restrict the flow of gas (e.g., carbon monoxide, hydrogen sulfide, oxygen, etc.) to the working electrode 224. The diffusion bather can be created by forming the opening 228 as a capillary, and/or a film or membrane can be used to control the mass flow rate through the one or more openings 228.

In an embodiment, the opening 228 may serve as a capillary opening to provide a rate limited exchange of the gases between the interior and exterior of the housing 212. In an embodiment, the opening 228 may have a diameter between about 200 μm and about 1.5 mm, where the opening 228 can be formed using a conventional drill for larger openings and a laser drill for smaller openings. The opening 228 may have a length between about 0.5 mm and about 5 mm, depending on the thickness of the cap or housing 212. In some embodiments, two or more openings may be present for the inlet gases. When a membrane is used to control the gas flow into and/or out of the housing, the opening diameter may be larger than the sizes listed above as the film can contribute to and/or may be responsible for controlling the flow rate of the gases into and out of the housing 212.

The reservoir 214 comprises the counter electrode 216, the reference electrode 220, and the working electrode 224. In some embodiments, the electrolyte can be contained within the reservoir 214, and the counter electrode 216, the reference electrode 220, and the working electrode 224 can be in electrical contact through the electrolyte. In some embodiments, one or more porous separators 218, 222 or other porous structures can be used to retain the electrolyte in contact with the electrodes 216, 220, 224. The separators 218, 222 can comprise a porous member that acts as a wick for the retention and transport of the electrolyte between the reservoir 214 and the electrodes 216, 220, 224 while being electrically insulating to prevent shorting due to direct contact between any two electrodes. One or more of the porous separators 218, 222 can extend into the reservoir 214 to provide the electrolyte a path to the electrodes 216, 220, 224. In an embodiment, a separator 218 can be disposed between the counter electrode 216 and the reference electrode 220, and a separator 222 can be disposed between the reference electrode 220 and the working electrode 224.

One or more of the separators 218, 222 can comprise a nonwoven porous material (e.g., a porous felt member), a woven porous material, a porous polymer (e.g., an open cell foam, a solid porous plastic, etc.), or the like, and is generally chemically inert with respect to the electrolyte and the materials forming the electrodes. In an embodiment, the separators 218, 222 can be formed from various materials that are substantially chemically inert to the electrolyte including, but not limited to, glass (e.g., a glass mat), polymer (plastic discs), ceramics, or the like.

The electrolyte can be any conventional aqueous acidic electrolyte such as sulfuric acid, phosphoric acid, or a neutral ionic solution such as a salt solution (e.g., a lithium salt such as lithium chloride, etc.), or any combination thereof. For example, the electrolyte can comprise sulfuric acid having a molar concentration between about 3 M to about 12 M. Since sulfuric acid is hygroscopic, the concentration can vary from about 10 to about 70 wt % (1 to 11.5 molar) over a relative humidity (RH) range of the environment of about 3 to about 95%. In an embodiment, the electrolyte can comprise phosphoric acid having a concentration in an aqueous solution between about 30% to about 60% $H_3PO_4$ by weight. As another example, the electrolyte can include a lithium chloride salt having about 30% to about 60% LiCl by weight, with the balance being an aqueous solution. As another example, a proton conducting ionic liquid may be used.

In some embodiments, the electrolyte may be in the form of a solid polymer electrolyte which comprises an ionic exchange membrane. In some embodiments, the electrolyte can be in the form of a free liquid, disposed in a matrix or slurry such as glass fibers (e.g., the separator 218, the separator 222, etc.), or disposed in the form of a semi-solid or solid gel.

The working electrode 224 may be disposed within the housing 212. The gas entering the sensor 210 can contact one side of the working electrode 224 and pass through working electrode 224 to reach the interface between the working electrode 224 and the electrolyte. The gas can then react to generate the current indicative of the gas concentration. As disclosed herein, the working electrode 224 can comprise a plurality of layers. The base or substrate layer can comprise a hydrophobic material or a hydrophobically treated material. A catalytic material can be formed as an electrode on one side of the working electrode 224 and placed in contact with the electrolyte.

In an embodiment, the working electrode 224 can comprise a porous substrate or membrane as the base layer. The substrate can be porous to the gas of interest, which in some embodiments can comprise hydrogen sulfide, carbon monoxide, or oxygen. In an embodiment, the substrate can comprise a carbon paper formed of carbon or graphite fibers. In some embodiments, the substrate can be made to be electrically conductive through the addition of a conductive material such as carbon. The use of carbon may provide a sufficient degree of electrical conductivity to allow the current generated by the reaction of the gas with the electrolyte at the surface of the working electrode 224 to be detected by a lead coupled to the working electrode 224. Other electrically conductive substrates may also be used such as carbon felts, porous carbon boards, and/or electrically conductive polymers such as polyacetylene, each of which may be made hydrophobic as described below. Alternatively, an electrically conductive lead can be coupled to the catalytic layer to electrically couple the catalytic material to the external circuitry, as described in more detail herein. In an embodiment, the substrate can be between about 5 mils to about 20 mils thick in some embodiments.

The porous substrate can be hydrophobic to prevent the electrolyte from passing through the working electrode 224. The substrate can be formed from a hydrophobic material, or the substrate can be treated with a hydrophobic material. In an embodiment, the substrate can be made hydrophobic through the impregnation of the substrate with a hydrophobic material such as a fluorinated polymer (e.g., PTFE, etc.). In some embodiments, the substrate or membrane can comprise GEFC-IES (e.g., the copolymer of perfluorosulfonic acid and PTFE, which is commercially available from Golden Energy Fuel Cell Co., Ltd.), Nafion® (a copolymer of polytetrafluoroethylene and perfluoro-3,6-dioxa-4-methyl-7-octene-sulfonic acid, which is commercially available from Dupont™), or pure or nearly pure polytetrafluoroethylene (PTFE). The impregnation process can include disposing a hydrophobic material containing solution or slurry on the substrate using a dipping, coating, or rolling process. Alternatively, a dry composition such as a powder can be applied to the substrate. In some embodiments, an optional sintering process can be used to infuse the hydrophobic material into the substrate to create the hydrophobic base layer for the working electrode 224, where both sides of the hydrophobic base layer are hydrophobic. The sintering process can cause the hydrophobic polymer to bond or fuse with the carbon of the substrate to securely bond the hydrophobic material to the substrate.

The resulting substrates can contain about 30% to about 50% by weight of the hydrophobic polymer. The amount of hydrophobic material added to the substrate can affect the electrical conductivity of the substrate, where the electrical conductivity tends to decrease with an increased amount of the hydrophobic material. The amount of the hydrophobic polymer used with the substrate may depend on the degree of hydrophobicity desired, the porosity to the target gas, and the resulting electrical conductivity of the working electrode.

The catalytic layer can be formed by mixing the desired catalyst with a binder and depositing the mixture on the substrate material. The binder can comprise a solution of perfluorinated ion electrolyte solution (e.g., GEFC-IES, Nafion®, etc.), a hydrophobic material such as PTFE, mixtures thereof, or the like. When used as a binder, the GEFC-IES Nafion® and/or PTFE can affect the gas diffusion parameters while supporting the electrocatalyst and maximizing the interfaces between catalyst, gas, and electrolyte at which the electrochemical processes occur. Glycol or other similar chemicals can be used as a diluent to form a catalyst slurry, recipe, or catalyst system, which can be printed on a substrate by a printer.

The catalytic layer might be deposited onto the substrate by, for example, screen printing, filtering in selected areas from a suspension placed onto the substrate, by spray coating, or any other method suitable for producing a patterned deposition of solid material. Deposition might be of a single material or of more than one material sequentially in layers, so as, for example, to vary the properties of the electrode material through its thickness or to add a second layer of increased electrical conductivity above or below the layer which is the main site of gas reaction. Once deposited, the printed element can be sintered at an elevated temperature to form the electrode.

In the working electrode 224, the catalytic layer can comprise carbon (e.g., graphite) and/or one or more metals or metal oxides such as copper, silver, gold, nickel, palladium, platinum, ruthenium, iridium, and/or oxides of these metals. The catalyst used can be a pure metal powder, a metal powder combined with carbon, or a metal powder supported on an electrically conductive medium such as carbon, or a combination of two or more metal powders either as a blend or as an alloy. The materials used for the individual electrodes can be the same or different. In an embodiment, the working electrode 224 comprises a platinum-ruthenium black (Pt—Ru black) electrode. The atomic ratio of the Pt to Ru in the Pt—Ru black electrode can be in the range of about 1:1 to about 1:5, or about 1:2. The catalyst material can have a weight loading per square centimeter ($cm^2$) of the surface area of the working electrode 224 of between about 0.1 $mg/cm^2$ and about 5 $mg/cm^2$, or between about 0.5 $mg/cm^2$ and about 2 $mg/cm^2$, or about 1 $mg/cm^2$.

The counter electrode 216 can be disposed within the housing 212. The counter electrode 216 can comprise a substrate or membrane such as a PTFE membrane, a GEFC-IES membrane, a Nafion® membrane, or the like having a catalytic material disposed thereon. In an embodiment, the catalytic material can be mixed and disposed on the membrane using any suitable process such as rolling, coating, screen printing, or the like to apply the catalytic material on the membrane, as described in more detail herein. The catalyst layer can then be bonded to the membrane through a sintering process as described herein.

In an embodiment, the catalytic material for the counter electrode can comprise a noble metal such as gold (Au), platinum (Pt), ruthenium (Ru), rhodium (Rh), Iridium (Ir), oxides thereof, or any combination thereof. In an embodiment, the catalytic material comprises a Pt—Ru mixture that is screen printed on the membrane, where the membrane can be a GEFC-IES membrane. The catalyst loading for the counter electrode 216 can be within any of the ranges described herein for the working electrode 224. In an embodiment, the catalyst loading for the counter electrode 216 can be the same or substantially the same as the catalyst loading for the working electrode 224, the catalyst loading can also be greater than or less than that of the working electrode 224.

Similarly, the reference electrode 220 can be disposed within the housing 212. The reference electrode 220 can comprise a substrate or membrane such as a PTFE membrane, a GEFC-IES membrane, a Nafion® membrane, or the like having a catalytic material disposed thereon. In an embodiment, the catalytic material can be mixed with a hydrophobic material (e.g., PTFE, etc.) and disposed on the PTFE membrane. Any of the methods used to form the working electrode or the counter electrode can also be used to prepare the reference electrode 220. In an embodiment, the catalytic material used with the reference electrode 220 can comprise a noble metal such as gold (Au), platinum (Pt), ruthenium (Ru), rhodium (Rh), Iridium (Ir), oxides thereof, or any combination thereof. In an embodiment, the catalytic material used to form the reference electrode 220 can comprise a Pt—Ru mixture that is screen printed on the membrane, where the membrane can be a GEFC-IES membrane. The catalyst loading for the reference electrode 220 can be within any of the ranges described herein for the working electrode 224. In an embodiment, the catalyst loading for the reference electrode 220 can be the same or substantially the same as the catalyst loading for the working electrode 224, the catalyst loading can also be greater than or less than that of the working electrode 224. While illustrated in FIG. 1 as having the reference electrode 220, some embodiments of the electrochemical sensor may not include a reference electrode 220.

In order to detect the current and/or potential difference across the electrodes in response to the presence of the target gas, one or more leads or electrical contacts can be electrically coupled to the working electrode 224, the reference electrode 220, and/or the counter electrode 216. The lead contacting the working electrode 224 can contact either side of the working electrode 224 since the substrate comprises an electrically conductive material. In order to avoid the corrosive effects of the electrolyte, the lead contacting the working electrode 224 can contact the side of the working electrode 224 that is not in contact with the electrolyte. Leads may be similarly electrically coupled to the counter electrode 216 and the reference electrode 220. The leads can be electrically coupled to external connection pins to provide an electrical connection to external processing circuitry. The external circuitry can detect the current and/or potential difference between the electrodes and convert the current into a corresponding target gas concentration.

In some embodiments, the sensor 210 may comprise one or more diagnostic micro-electrodes 232 and 234 (which may be similar to the micro-electrodes 12, 14 of FIG. 1). The diagnostic electrode may be a wire (as shown in FIG. 2), where the exposed tip of the wire can be pushed into the separators 222, 218 to avoid it shorting against the adjacent electrodes. However an alternative approach includes sandwiching the micro-electrodes 232, 234 between two separators. Other configurations come within the spirit and scope of the invention. For example, the micro-electrodes may comprise uninsulated platinum wire and may operate as micro-cylinder electrodes, or they may be formed by deposition of platinum onto a contact pin or pad by techniques such as electroplating or sputtering, or by thick film printing platinum onto a ceramic substrate. In some embodiments, each micro-electrode 232, 234 may be used for separate diagnostic purposes, such as hydrogen peak reference, oxygen peak identification, etc. The micro-electrodes may comprise platinum, gold, ruthenium, rhodium, iridium, palladium, rhenium, osmium, or their alloys with each other or with other metals (e.g. platinum/nickel alloys).

In use, the sensor 210 can detect a target gas concentration. In use, the ambient gas can flow into the sensor 210 through the opening 228, which serves as the intake port for the sensor 210. The ambient gas can comprise a concentration of the target gas, which may include hydrogen sulfide, oxygen, and/or carbon monoxide. The gas can contact the working electrode 224 and pass through the fine pores of the porous substrate layer to reach the surface of the working electrode 224 treated with the catalyst layer. The electrolyte may be in contact with the surface of the working electrode 224, and the target gas may react and result in an electrolytic current forming between the working electrode 224 and the counter electrode 216 that corresponds to the concentration of the target gas in the ambient gas. By measuring the current, the concentration of target gas can be determined using, for example, the external detection circuitry.

In some embodiments of the disclosure, one or more elements of the sensor (as described above in FIGS. 1 and 2) may be scanned using scanning voltammetry to observe the effects of changing concentration in the electrolyte (E above).

An electrochemical sensor may be scanned using one or more of the electrodes. In some embodiments, the scanning may be done on a micro-electrode within the sensor. The scan may generate a graph that contains a plurality of peaks due to adsorption, desorption, formation, and/or reduction of certain elements. The scanning may be completed at a plurality of electrolyte concentrations, wherein the graphs for each of the concentrations may be compared. In some embodiments, the graph may show one or more peaks that are consistent for each concentration, which may be considered reference peaks. Additionally, the graph may show one or more peaks that change with concentration. The difference in voltage between the concentration dependent peak(s) and the reference peak(s) may provide a correlation for electrolyte concentration. This correlation may approximately linear when the axes of the graph are electrolyte concentration and voltage difference between the two peaks.

Once a correlation is established, the electrolyte concentration for similar electrochemical sensors may be determined by completing a voltammetry scan on the sensor, and then identifying the relevant peaks to the correlation. Once the voltage difference between the peaks is identified, the electrolyte concentration may be determined. The determined electrolyte concentration may be used to correct sensor readings, and/or to identify any other errors with the sensor.

In some embodiments, a diagnostic micro-electrode may be used to complete the voltammetry scans. The benefits to using a micro-electrode may be that it would be lower power, require a shorter measurement time, suffers less distortion of the measurement due to ohmic losses in the electrolyte, and it avoids disturbing the main gas working electrode.

The disclosure having been generally described, the following examples are given as particular embodiments of the disclosure and to demonstrate the practice and advantages thereof. It is understood that the examples are given by way of illustration and are not intended to limit the specification or the claims in any manner.

Figure 3:
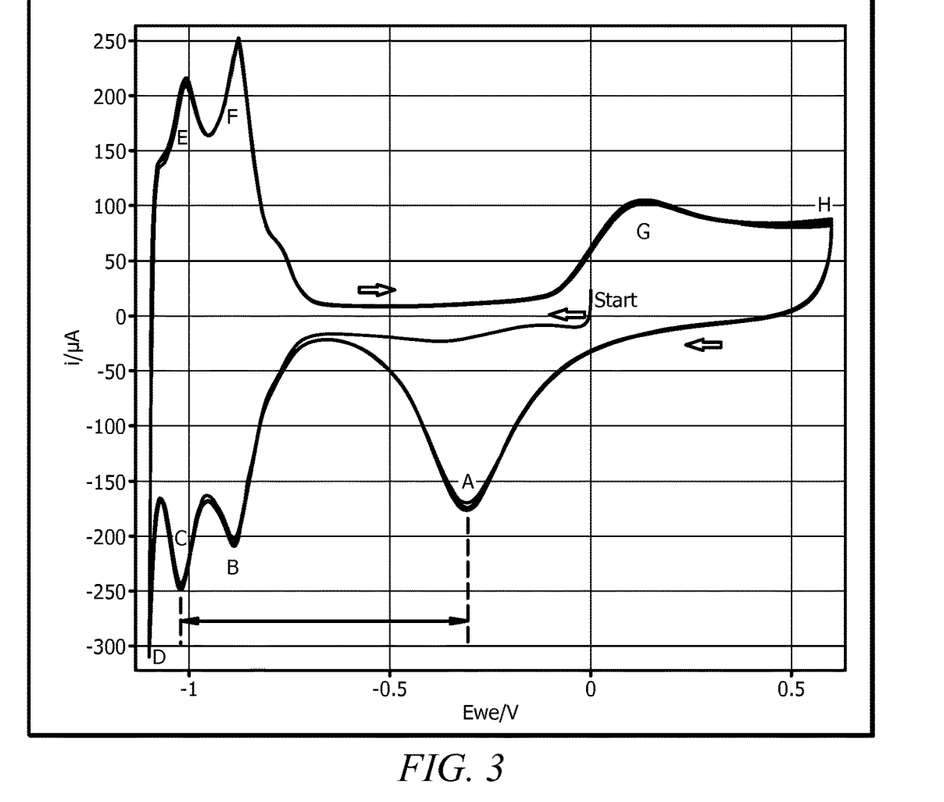
FIG. 3 illustrates a graph of current vs. potential according to an embodiment.

FIG. 3 illustrates a staircase voltammogram of an exemplary electrode. To investigate the effects of the changing concentration of electrolyte in the sensor cells, scanning voltammetry may be performed in a range of $H_2SO_4$ solutions (0.6 M, 2.5 M, 5 M, 8 M, 10 M, and 12 M) and the results are shown in FIG. 3. In other words, using the same electrode, acid concentration was varied between 0.6 M and 12 M.

The staircase voltammogram shown in FIG. 3 illustrates a plot generated from an exemplary micro-electrode that comprises a 50 μm diameter platinum wire approximately 6 mm long immersed in electrolyte. The scanning was completed at 5 V/s, with 2 mV steps, and 100% charge integration. The sensor was galvanostatically scanned 10 times between hydrogen (H2) and oxygen (O2) evolution to clean the electrode prior to voltammetry scanning. The wire micro-electrode was driven relative to usual platinum reference and counter electrodes.

As shown in FIG. 3, hydrogen peaks (B, C, E, and F) occur at a well-defined potential and therefore can be used as a standard reference, where peak (C) is the most well-defined. The peaks indicating oxide formation (G) and reduction (A) appear to be electrolyte concentration dependent, where peak (G) is not always well defined. However peak (A) is always clear and easy to detect but its position varies with anodic swing (H). Therefore, to determine a correlation, the anodic swing (H) may be fixed relative to the hydrogen peak (C) so that the voltage difference (i.e. V(A)−V(C)) is then a measure of electrolyte concentration. In the testing illustrated by FIG. 3, it was shown that the presence of oxygen does not interfere with the measurement.

Figure 4A:
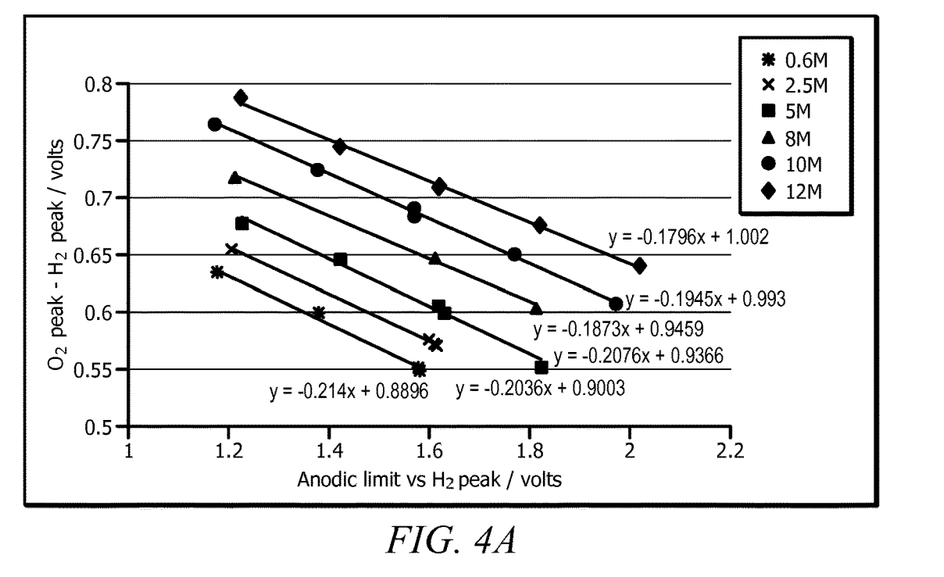
FIG. 4A illustrates a graph of potential difference vs. anodic swing according to an embodiment.
Figure 4B:
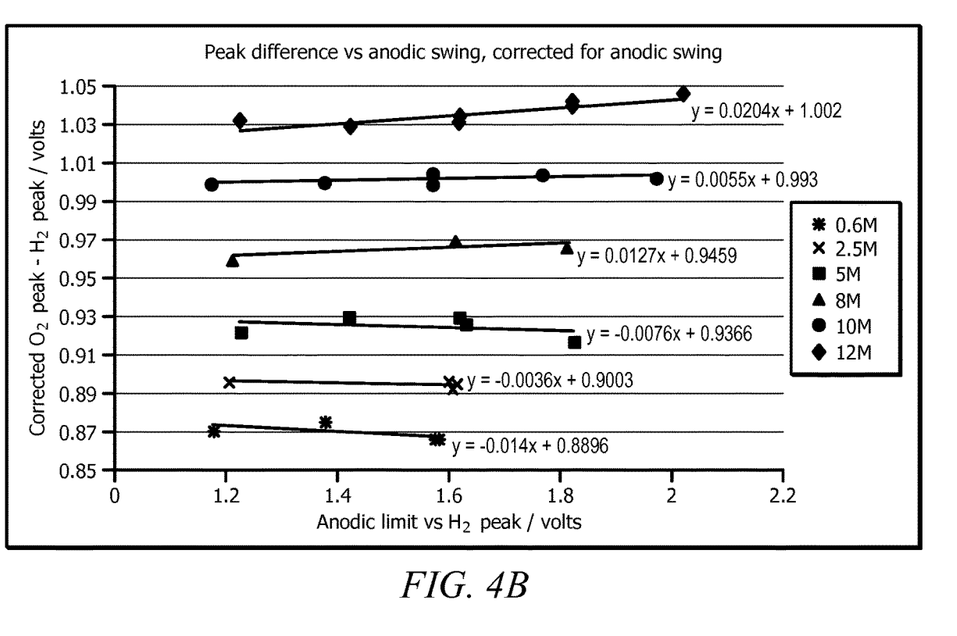
FIG. 4B illustrates a graph of potential difference vs. anodic swing, corrected for anodic swing, according to an embodiment.

FIG. 4A illustrates the oxide reduction peak position dependent on the anodic limit. The linear correlations are illustrated on the graph. To correct for the anodic limit, the slopes of the linear correlations may be adjusted. As shown in FIG. 4B a slope of approximately 0.2*x was applied to the data. FIG. 4B illustrates the correction for effects of the anodic limit. In another embodiment, the effect of the anodic limit may be accounted for when determining the peak difference, wherein anodic limit may be defined relative to the hydrogen reference peak.

Figure 4C:
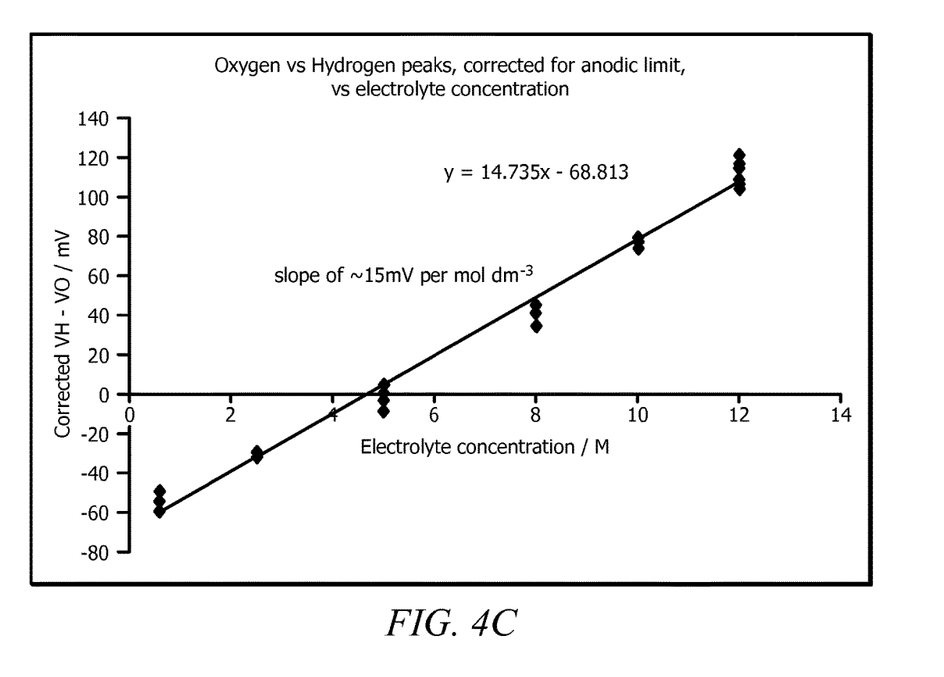
FIG. 4C illustrates a graph of corrected potential difference vs. concentration of the electrolyte according to an embodiment.

FIG. 4C illustrates the corrected peak difference values as a function of electrolyte concentration. FIG. 4C shows that there is a strong correlation between the potential difference between the two peaks (oxide reduction and adsorbed hydrogen) and the concentration of the electrolyte. Therefore, this measurement could therefore be used as an indicator of the concentration of the electrolyte. Additionally, the potential appears to be linearly dependent on electrolyte concentration over the full range of environmental interest (0.6 M-12 M).

In some embodiments, temperature may have an effect on the electrolyte concentration measurement by diagnostic micro-electrode. The effect may be small and may be easily compensated for by using a low accuracy temperature sensor. As an example, the observed peak separation increased by around 1 mV/C, which may be equivalent to approximately 0.07 M/C.

In some embodiments, the voltammetry may be completed using square wave voltammetry (SWV). Using SWV may improve the definition of the hydrogen peaks over traditional staircase voltammetry. In some embodiments, both techniques may be used. For example, SWV may be used to determine the hydrogen peaks, and then subsequent staircase voltammetry may be used to determine the oxide reduction peak. Also, square wave voltammetry allows for detection of an additional peak for oxide formation (which is normally only a shoulder in voltammetry). This additional peak is also a function of both electrolyte concentration and temperature, so it could be used in addition to or instead of the oxide reduction peak. One benefit of using the above described method is that the position of the oxide formation peak (G) is not affected by the anodic limit since it is formed on the anodic scan, therefore it is not necessary to perform the correction shown in FIG. 4B or to control the anodic limit. A further benefit of using the oxide formation peak (G) is that it gives a measurement which is more sensitive to the electrolyte concentration and less sensitive to temperature. The following equations were obtained by fitting the results of square voltammetry on sensors of the design shown in FIG. 1, with a range of sulphuric acid concentrations from 7 to 14 M over a temperature range from 20 C to 50 C.

$$V(A-C)=552+0.582\times \text{Temperature}+10.44\times \text{Concentration}$$

$$V(G-C)=852+0.102\times \text{Temperature}+17.59\times \text{Concentration}$$

Where V(A−C) is the potential difference in millivolts between the oxide reduction peak and a hydrogen peak, V(G−C) is the potential difference in millivolts between the oxide formation peak and a hydrogen peak, temperature is in degrees Celsius and Concentration is in moles per liter. The use of the formation peak gives a more sensitive measure of the electrolyte concentration with less need for temperature compensation. Alternatively, the two equations can be solved simultaneously to allow both the concentration and temperature to be determined, avoiding the need for a separate temperature sensor to be present.

Square wave voltammetry adds additional parameters which can be adjusted to optimise the measurement. For example, variation of step height changes the intensities of the oxide peaks but does not affect the hydrogen peaks. So SWV could be used to optimize the peaks for ease of measurement or to help distinguish between the peak types, thereby simplifying the detection methods.

Figure 5:
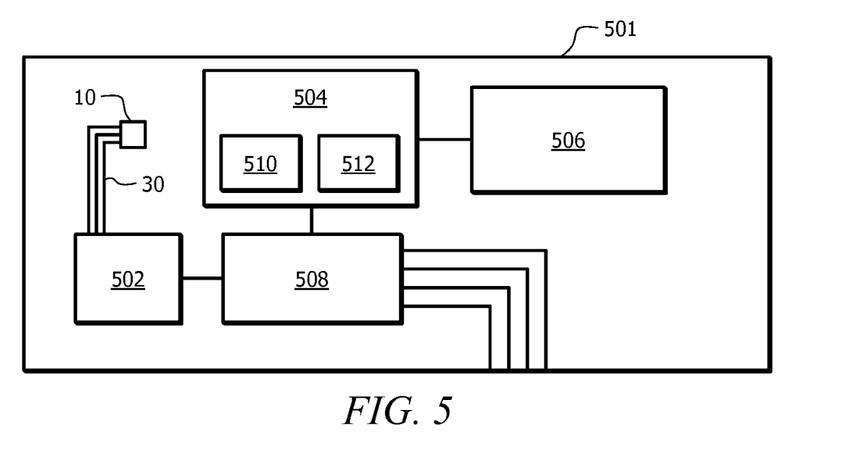
FIG. 5 schematically illustrates a sensor on a circuit board according to an embodiment.

FIG. 5 illustrates the sensor 10 in the context of a larger circuit. The circuit can include a circuit board 501, which can comprise a separate component from the sensor 10, a portion of the housing, or in some embodiments, an extension of the substrate such that the sensor 10 is formed on a single substrate that the other components are also disposed on. In this embodiment, the leads 30 may extend through a wall of the housing, and contact various external circuitry such as various sensing circuitry 506 (e.g. sensors, meters, etc.), a potentiostat 502, operating and control circuitry 504, communication circuitry 508, and the like. The sensor 10 and meters can comprise additional sensors such as temperature and/or pressure sensors, which may allow for compensation of the sensor 10 outputs such that the compensation measurements are taken at or near the sensor 10 itself. Further, the location of the sensing circuitry 506 at or near the sensor 10 may allow smaller currents to be detected without intervening resistance, current loss, or electrical noise in longer electrical conductors. The control circuitry 504 may comprise a processor 510 and a memory 512 for performing various calculations and control functions, which can be performed in software or hardware. The communication circuitry 508 may allow the overall sensor results or readings to be communicated to an external source, and can include both wired communications using, for example, contacts on the board, or wireless communications using a transceiver operating under a variety of communication protocols (e.g., WiFi, Bluetooth, etc.). In some embodiments, the sensor 10 can be a separate component that is electrically coupled to external operating circuitry.

The control circuitry 504 of the sensor 10 may be operable to control the potentiostat 502 to complete the voltammetry scans of the sensor. The control circuitry 504 may also receive the readings from the sensor 10 that are generated during the voltammetry scans, and may be configured to analyze the readings, as described above.

Having described the devices and methods herein, various embodiments can include, but are not limited to:

In a first embodiment, a method for identifying a concentration of an electrolyte may comprise scanning a diagnostic electrode of an electrochemical sensor using scanning voltammetry, wherein the electrochemical sensor has been employed, wherein the diagnostic electrode comprises a smaller surface area than a working electrode or a counter electrode; generating a set of readings; identifying one or more peaks in the set of reading; and determining the electrolyte concentration of the electrolyte of the electrochemical sensor by applying a correlation with the identified peak(s).

A second embodiment can include the method of the first embodiment, further comprising scanning a diagnostic electrode of an electrochemical sensor using scanning voltammetry at a plurality of electrolyte concentrations; generating a variable set of readings from the scanning voltammetry scan using oxygen formation and reduction peak(s) of the scan; and determining a correlation by plotting the variable set of readings and the plurality of electrolyte concentrations.

A third embodiment can include the method of the first or second embodiments, further comprising generating a reference set of readings from the voltammetry scan using hydrogen adsorption and/or desorption peak(s) of the scan.

A fourth embodiment can include the method of the third embodiment, wherein the variable set of readings comprises a potential difference between a hydrogen adsorption peak and the oxide reduction peak.

A fifth embodiment can include the method of the fourth embodiment, further comprising correcting the potential difference based on an anodic limit.

A sixth embodiment can include the method of any of the first to fifth embodiments, wherein the oxide formation peak and oxide reduction peak are used with the hydrogen adsorption peak to simultaneously determine concentration and temperature.

A seventh embodiment can include the method of any of the first to sixth embodiments, the variable set of readings comprises a potential difference between a hydrogen adsorption peak and the oxide formation peak.

An eighth embodiment can include the method of any of the first to seventh embodiments, wherein the scanning voltammetry is performed on a diagnostic micro-electrode of the electrochemical sensor, wherein the diagnostic micro-electrode is immersed in the electrolyte.

A ninth embodiment can include the method of any of the first to eighth embodiments, further comprising correcting an output value from the electrochemical sensor based on the determined electrolyte concentration to provide a more accurate reading of a concentration of one or more gases.

A tenth embodiment can include the method of any of the first to ninth embodiments, further comprising identifying that the determined concentration is abnormal i.e. too high or too low, and therefore could result in an error in the sensor.

In an eleventh embodiment, an electrochemical sensor may comprise a housing; an electrolyte disposed within the housing; a plurality of electrodes in contact with the electrolyte within the housing, wherein the plurality of electrodes comprises a working electrode and a counter electrode; a diagnostic micro-electrode; and a control circuitry configured to scan the diagnostic micro-electrode of the electrochemical sensor using scanning voltammetry at a plurality of electrolyte concentrations; generate a variable set of readings from the first voltammetry scan using oxide formation and reduction peak(s) of the scan; and determine a correlation by plotting the variable set of readings and the plurality of electrolyte concentrations.

A twelfth embodiment can include the sensor of the eleventh embodiment, wherein the control circuitry is further configured to scan the electrochemical sensor after it has been employed using scanning voltammetry; generate a second set of readings; and determine a current concentration of the electrolyte of the second electrochemical sensor by applying the determined correlation to the second set of readings.

A thirteenth embodiment can include the sensor of the eleventh or twelfth embodiments, wherein the control circuitry is further configured to generate a reference set of readings from the first scanning voltammetry scan using hydrogen adsorption and desorption peak(s) of the scan.

A fourteenth embodiment can include the sensor of the thirteenth embodiment, wherein the variable set of readings comprises a potential difference between a hydrogen peak and the oxide reduction peak.

A fifteenth embodiment can include the sensor of the any of the eleventh to fourteenth embodiments, wherein the scanning voltammetry comprises square wave voltammetry.

A sixteenth embodiment can include the sensor of any of the eleventh to fifteenth embodiments, wherein the scanning voltammetry comprises staircase voltammetry.

A seventeenth embodiment can include the sensor of any of the eleventh to sixteenth embodiments, wherein the plurality of electrolyte concentrations ranges from 0.1 M to 12 M.

In an eighteenth embodiment, a method for identifying a concentration of an electrolyte may comprise scanning a diagnostic electrode of an electrochemical sensor using a first scanning voltammetry scan at a plurality of electrolyte concentrations, wherein the diagnostic electrode comprises a smaller surface area than a working electrode or a counter electrode; generating a variable set of readings from the first scanning voltammetry scan using one or more oxide peak(s) of the scan; and determining a correlation by plotting the variable set of readings and the plurality of electrolyte concentrations.

A nineteenth embodiment can include the method the eighteenth embodiment, further comprising scanning a second electrochemical sensor that has been employed using scanning voltammetry; generating a second set of readings; and determining a current concentration of the electrolyte of the second electrochemical sensor by applying the determined correlation to the second set of readings.

A twentieth embodiment can include the method of the eighteenth or nineteenth embodiments, wherein the scanning voltammetry comprises a square wave voltammetry, While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of" "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for identifying a concentration of an electrolyte, the method comprising:
   scanning a diagnostic electrode of an electrochemical sensor using scanning voltammetry, wherein the diagnostic electrode is immersed in the electrolyte and wherein the diagnostic electrode comprises a smaller surface area than a working electrode or a counter electrode;
   generating a set of readings from the scanning voltammetry;
   identifying one or more peaks in the set of readings; and
   determining the electrolyte concentration of the electrolyte of the electrochemical sensor by applying a predetermined correlation to a voltage difference between the identified peak(s).

2. The method of claim 1, further comprising:
   scanning a diagnostic electrode of an electrochemical sensor using scanning voltammetry at a plurality of electrolyte concentrations;
   generating a variable set of readings from a scanning voltammetry scan using oxygen formation and reduction peak(s) of the scanning voltammetry scan; and
   determining a correlation by plotting the variable set of readings and the plurality of electrolyte concentrations.

3. The method of claim 2, further comprising generating a reference set of readings from the scanning voltammetry scan using hydrogen adsorption and desorption peak(s) of the scanning voltammetry scan.

4. The method of claim 3, wherein the variable set of readings comprises a potential difference between a hydrogen adsorption peak and an oxide reduction peak.

5. The method of claim 4, further comprising correcting the potential difference based on an anodic limit.

6. The method of claim 3, wherein an oxide formation peak and an oxide reduction peak are used with a hydrogen adsorption peak to simultaneously determine concentration and temperature.

7. The method of claim 1, the set of readings comprises a potential difference between a hydrogen adsorption peak and an oxide formation peak.

8. The method of claim 1, further comprising correcting an output value from the electrochemical sensor based on the determined electrolyte concentration to provide a more accurate reading of a concentration of one or more gases.

9. The method of claim 1, further comprising identifying that the determined concentration is abnormal, i.e. too high or too low, and therefore could result in an error in the electrochemical sensor.

10. An electrochemical sensor comprising:
    a housing;
    an electrolyte disposed within the housing;

a plurality of electrodes in contact with the electrolyte within the housing,
wherein the plurality of electrodes comprises a working electrode and a counter electrode;
a diagnostic micro-electrode; and
a control circuitry configured to:
scan the diagnostic micro-electrode of the electrochemical sensor using scanning voltammetry at a plurality of electrolyte concentrations;
generate a variable set of readings from a scanning voltammetry scan using oxide formation and reduction peak(s) of the scanning voltammetry scan; and
determine a correlation by plotting the variable set of readings and the plurality of electrolyte concentrations.

11. The electrochemical sensor of claim 10, wherein the control circuitry is further configured to:
scan the electrochemical sensor after it has been employed using scanning voltammetry;
generate a second set of readings; and
determine a current concentration of the electrolyte of the electrochemical sensor by applying the determined correlation to the second set of readings.

12. The electrochemical sensor of claim 10, wherein the control circuitry is further configured to generate a reference set of readings from the scanning voltammetry scan using hydrogen adsorption and desorption peak(s) of the scan.

13. The electrochemical sensor of claim 12, wherein the variable set of readings comprises a potential difference between a hydrogen peak and an oxide formation peak.

14. The electrochemical sensor of claim 10, wherein the scanning voltammetry comprises square wave voltammetry.

* * * * *